United States Patent [19]
Gould

[11] Patent Number: 5,144,482
[45] Date of Patent: Sep. 1, 1992

[54] THREE DIMENSIONAL VIEWING APPARATUS INCLUDING A STACK OF TRANSPARENT PLATES AND RELATED METHOD

[76] Inventor: Dennis R. Gould, 4180 LaHonda Rd., San Gregorio, Calif. 94074

[21] Appl. No.: 698,807

[22] Filed: May 13, 1991

[51] Int. Cl.⁵ .................... G02B 27/27; G02B 27/10; G03C 9/08
[52] U.S. Cl. .................................... 359/478; 354/75; 354/202; 354/295
[58] Field of Search ................................ 350/144, 130

[56] References Cited
U.S. PATENT DOCUMENTS

| | | | |
|---|---|---|---|
| 336,257 | 2/1886 | Palmer | 350/534 |
| 3,891,305 | 6/1975 | Fader | 350/144 |
| 3,970,361 | 7/1976 | DiMatteo et al. | 350/144 |
| 4,309,074 | 1/1982 | Granieri | 350/144 |
| 4,671,625 | 6/1987 | Noble | 350/144 |
| 4,747,665 | 5/1988 | O'Brien | 350/144 |

FOREIGN PATENT DOCUMENTS
598336 2/1948 United Kingdom ............... 350/144

Primary Examiner—Jon W. Henry
Attorney, Agent, or Firm—Thomas M. Freiburger

[57] ABSTRACT

A method and apparatus for viewing two dimensional images with a three dimensional effect utilizes a stack of closely spaced, thin plates, producing a multiple interferometer effect via inter and intra plate reflections between the plates. A conventional two dimensional image, such as a print or a back-lighted transparency or a video screen may be viewed through the stack of plates, so as to give an appearance and attributes of three dimensions, via the multiple interferometer effect. In a second embodiment, dedicated images may be produced by photographing or videotaping or otherwise recording images through the stack of plates. When such a dedicated image is later viewed through the stack of plates, a further enhanced three dimensional effect is observed. In preferred embodiments the stack of plates include about 10 to 100 thin plates, in closely and evenly spaced relationship.

15 Claims, 5 Drawing Sheets

THREE DIMENSIONAL VIEWING APPARATUS INCLUDING A STACK OF TRANSPARENT PLATES AND RELATED METHOD

BACKGROUND OF THE INVENTION

The present invention relates to the field of optics, and more particularly to a specific apparatus and process for three dimensional (3-D) image presentation.

Workers in the photographic and optics fields have long sought practical methods and systems for presenting images in 3-D to viewers, including 3-D presentations of video screen images, transparency images or printed images.

An object of this invention is to provide a display apparatus and method that simulates a surprisingly realistic 3-D effect when viewing a normally flat two dimensional (2-D) image. In accordance with the invention, any 2-D image may be so viewed, including photographic images, video or computer screens, drawings, paintings or sketches. The images may be still or motion, black and white or colored, printed or broadcast, complex or sketchy.

A further object of this invention is to provide 3-D presentations of images recorded, processed, and presented using conventional 2-D means. For example, conventional (2-D) TV broadcasts are not affected in any way while viewers, equipped with an optically active device of the invention, will experience realistic depth of field image viewing. Thus, no special processing of the image or broadcast signal is required—no "3-D dedicated" broadcast is required (which may be distorted to the naked eye).

The same advantage of "undedicated" image presentation also applies to any image distribution means such as recorded video signals (i.e. from video cassette recordings), computer generated graphics (i.e., computer games), printed or published images, motion picture viewing, single or mass produced slides, postcards, photographs, etc.

A further and related object of this invention is to provide a realistic 3-D view of 2-D images without the need for "stereo glasses", usually required to view conventional 3-D stereo photographs. Such glasses provide a means to assure that each eye only sees its respective image from two photographs taken from slightly displaced points of view. The isolation of each eye can be by, for example, alternating polarization, color filtration or by alternate time-divided occlusion of each eye's vision, in timing with a shifting of images in a moving picture. Viewers not equipped with such glasses see a blurred or double image. In addition, some individuals have difficulty fusing the separate images, failing to experience an illusion of depth, or experience headaches with extended viewing. The present invention described below provides some degree of three dimensional effect even with only one eye viewing (however, both eyes viewing in coordination provides the best effect).

Modifications allowing the elimination of stereo glasses have been described; however, such methods still incorporate the principle of two or more displaced images. One approach has been the use of lenticular screens. Such screens consist of one or more sheets of connected thin cylindrical lenses, usually attached to the surface of specially processed photographic matrices assembled from two or more multiple views. A disadvantage of this approach is that each image must be specially processed; conventional film processing or conventional video display viewing systems are not compatible with these methods. An additional problem with the lenticular approach, as experienced by the viewer, is a "choppy" or "ripple" effect as the viewer shifts his viewing angle.

Another "stereo glasses free" technology is holography. Holographic methods provide a realistic 3-D image. However, as is the problem with the lenticular approach, this technology is not compatible with conventional photographic or video image viewing systems. In addition, holograms are limited to coherent or lased light illumination during the recording phase. Thus, holography cannot record whole light illuminated objects or scenes, but is limited to recording only images of objects placed relatively close to the photosensitive recording substrate. Further, complex set ups and alignments are usually required. For motion or full color holograms, even more complex set ups involving multiple exposures are required; these factors severely limit this approach for most conventional uses.

A still further object of this invention, in a second embodiment, is to provide apparatus and methods for dedicated recording and subsequent reconstruction of 3-D image signal information for transmission, processing or storage.

In the field of 3-D imaging and viewing, Jones U.S. Pat. No. 3,564,987 discloses the use of multiple, stacked cylindrical lenses to form multiple images on a recording medium. The disadvantages of these lenticular approaches have been discussed above. An additional disadvantage of this approach (as well as of conventional stereo photography) is the 3-D effect can only be experienced when the image is directly right-side up or directly up-side down; the depth effect is lost if viewed between these two extremes. Thus, the viewer has no degree of freedom of movement while viewing conventional stereo images. The Jones device does not involve an interferometer effect as in the present invention.

Pictet et al. U.S. Pat. No. 1,503,766 discloses the use of piles of glass in conjunction with the use of a pair of stereo binoculars. The piles of glass are used for the purpose of polarizing light in desired directions. The device disclosed by Pictet would have many of the above-described disadvantages and further includes the disadvantage of requiring a cumbersome pair of viewing lenses for viewing the image.

Denison U.S. Pat. No. 2,238,629 discloses the use of multiple cylindrical lenses in producing a three dimensional image. Separate pictures of the same object are photographed and viewed through separate lens systems in, for example, a stereoscopic camera. Noble U.S. Pat. No. 4,671,625 discloses a device for projecting and viewing an object which appears to float in space. Two convex lenses are used in viewing an image of an object. The image appears to float in space by virtue of the removal of surrounding visual information but is not projected as a three dimensional object.

Other patents in the imaging field include Rodriguez U.S. Pat. No. 2,674,919, Brachet U.S. Pat. No. 3,978,500, Yano U.S. Pat. No. 4,078,854, Nakken U.S. Pat. No. 2,185,221 and Geoffray U.S. Pat. No. 3,731,606.

SUMMARY OF THE INVENTION

In accordance with the present invention, an improved method and apparatus for 3-D imaging produces simulated 3-D images with surprisingly lifelike appearance from normally flat 2-D images. No stereo viewing glasses isolating each eye are needed, and the 3-D effect can be experienced even as the image is rotated 360° in the plane normal to the viewing angle. In addition, some degree of 3-D effect can be experienced with only one eye viewing. This 3-D effect may be generated from images produced, processed and presented by current conventional 2-D means such as conventional photography (print or transparency), video or computer screens, paintings and drawings. This 3-D effect is accomplished by means of incorporating a device which comprises multiply arrayed closely spaced interferometers (sometimes referred to hereafter as the anagram "MACSI"). Here, a general definition of an interferometer is an optical device consisting of at least two parallel semi-transparent, semi-reflectant surfaces bordering a light pathway. In the present invention, multiple reflections occur between the glass plates, and internal reflections within the glass plates may also contribute to the three dimensional effect.

A "MACSI" is an optical device that consists of an array or stack of essentially flat, transparent/semi-reflectant, thin plates each essentially equidistant at all points from its closest neighbors (FIG. 1A). Each pair of plates (any two adjacent plates in this array (FIG. 1B)), or group of pairs, as well as the entire array of plates have characteristics in common with interferometers such as the generation of visual interference "Newton's rings" (which can be demonstrated by placing the "MACSI" very close to one eye and looking through the "MACSI" at a fluorescent light source—faint concentric rings can be seen.

In preferred embodiments, the "MACSI" consists of an array of essentially clear plates with a thickness usually in the range of about 0.1 to 0.25 mm (No. 0 to No. 2 thickness). The thickness can be even less, and plates of thickness 0.07 to 0.1 mm have been used. Minimum practical thickness is a function of the size of the device (width or diameter) and fragility of the material used. Thickness may also be greater than 0.25 mm—but thicker glass (i.e. >0.25 mm) leads to increasing distortion. The essentially clear plates are here defined as having characteristics usually falling in the range of a transparency (transmission) between about 95% and about 99.9%, with a complementary reflectance of between about 0.1% and about 5.0%. None, one or more of the plates may be coated with reflectant enhancement or reflectant inhibiting coatings. Each plate or element is aligned essentially parallel to its closest neighbor (in a "curved" array of such plates, in an alternate embodiment, each plate is maintained essentially equidistant at all points from its neighboring plate). The plates may be essentially clear glass sheets; however, sheets made of any essentially clear materials such as clear polymers or crystals may be used. Usually all plates making up a MACSI are of uniform materials and optical density; however, regularly or randomly varying the plate material and/or optical density may also be used. The plates may be any shape, but are usually round, oval, square or rectangular.

The number of plates making up an optically functional MACSI device in accordance with the invention is usually between 10 and 100, but more usually between about 25 and 60. A more preferred range is between 30 and 55, depending on other factors. The number of elements required is a function of (1) thickness, (2) optical density, and (3) transparency/reflectance of the plates, as well as (4) the degree of depth effect desired. The larger the number of elements, generally the more exaggerated the depth effect, but with a concomitant loss in image sharpness and brightness. With fewer elements, the image is sharper and brighter, but the depth or three dimensional effect is reduced. Generally an optimum compromise between these two opposing effects can easily be determined by experimentation.

In addition, the size of the space separating each plate from its neighbors affects image sharpness, image brightness, and/or the degree of depth effect. This spacing, in one embodiment, can be controlled by the use of spacers or "washers" placed between each pair of adjacent plates. The inner diameter of such "washers" may be just slightly smaller than the outer diameter of the plates so as not to interfere with the viewing area through the center of the plates. The thickness of the washers is usually in the range of up to about 5 mm, with a minimum being near zero (absence of any spacers). Thin sheets of material such as paper sheets may be used as spacer material, with a thickness generally in the range of 0.1 to 0.2 mm. Again, the optimum thickness of the spacers with any given set of plates will depend on other factors as above, and can be determined by experimentation. In general, in the context of the present invention with a large number of plates, thinner spacers (zero to No. 1 thickness) will produce less blurring or fogging. If the spacing between plates is widened, this tends generally to produce more random reflections and thus more blurring or fogging. In experimentation with the present invention, spacers ranging in thickness between from essentially zero (no spacers) and about 5 mm have been used. The best embodiment discovered had spacing as described below, formed of 20 pound paper stock. Within a given range, increasing the spacing will produce some increase in blurring but also an increase in the three dimensional effect.

Usually the plates and washers are of constant thickness. However, regularly or randomly varying the thickness of the plates and/or washers provides additional options for balancing the desired depth effect versus image sharpness, and this is a possible implementation of the invention.

In one preferred embodiment of the invention, a device for use in viewing a two dimensional image and for producing a three dimensional effect to a viewer includes a stack of substantially parallel and transparent plates positioned between the two dimensional image and the viewer. The stack of plates includes spacer means between adjacent plates for holding the plates in substantially parallel and closely spaced relationship. Some form of illumination means provides lighting on the two dimensional image. The plates in the stack are nearly 100% transmissive to light from the image, but are partially reflective to that light. Further, the number of plates is sufficient to produce a three dimensional effect whereby some elements of the image appear closer to the viewer than other elements of the image. At the same time, the number of plates is not so great as to cause excessive reflection such that the viewer has difficulty seeing the image comfortably.

The number of plates, in preferred embodiments, is between about ten and one hundred; more preferably, the number of plates is between 25 and 60, or in a more preferred embodiment, between about 30 and 55. In one specific embodiment, the number of plates is about 40, with each plate having a thickness of about 0.1 to 0.25 mm.

The spacing between adjacent plates, in the embodiment just described, preferably is in the range of about 0.1 to 0.25 mm.

It is therefore among the objects of the present invention to provide a convenient means for viewing of images, moving or still, with a three dimensional effect, including images produced with a special three dimensional effect, and also typical two dimensional images. These and other objects, advantages and features of the invention will be apparent from the following description of preferred embodiments, considered along with the accompanying drawings.

DESCRIPTION OF PREFERRED EMBODIMENTS

Figure 1:
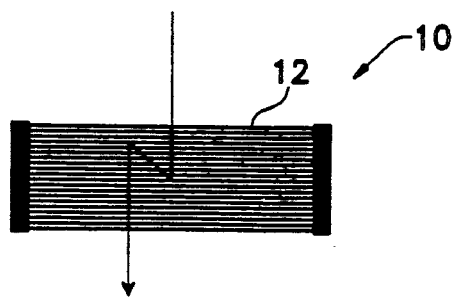
FIG. 1 is a schematic side view in sectional elevation, showing a stack of thin transparent plates forming a device in accordance with the invention, and schematically indicating internal reflection of light in the device.
Figure 1B:
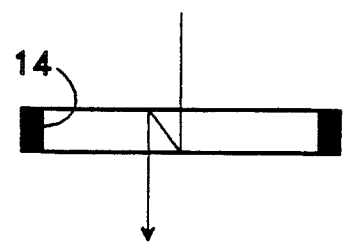
FIG. 1B is a schematic view showing in detail a pair of adjacent plates, or a single interferometer component, separated by a spacer or separator washer, with the spacing shown exaggerated. Again, an internal reflection between the adjacent plates is schematically indicated.
Figure 1A:
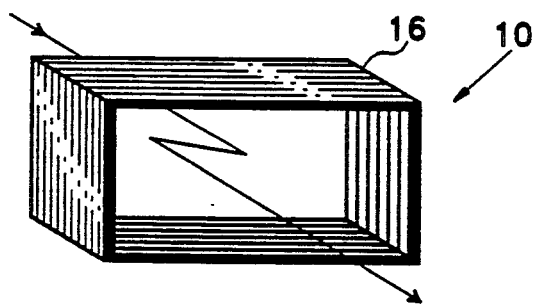
FIG. 1A is a perspective view of the device of FIG. 1, generally looking through the stack of plates.

In an embodiment of the invention shown in FIGS. 1, 1A and 1B, an array 10 of about 40 essentially clear glass plates 12, 150 mm square, and of a thickness commonly designated as No. 0 (zero), approximately 0.1 to 0.13 mm. (Corning Glass Inc.) was used. The plates are flat in this embodiment. Each plate is separated from its neighbor with "washer" spacers 14 made from black paper sheets (20 pound stock). It should be understood, however, that the spacers 14 may be made from any convenient material of the desired thickness. Black was chosen to minimize interfering external light. Sheets of consistent thickness are important in allowing plates to align essentially in parallel. The square washers border the periphery of each plate, establishing a 10 mm wide frame. Thus the unobstructed viewing area through the "MACSI" device in this embodiment is 130 mm square.

The "MACSI" array 10 is assembled in an essentially dust free environment using a photographic quality dust brush to remove any visible dust particles from each plate as the plates are stacked alternately between the pre-cut washers or spacers. Incorporated dust particles significantly interfere with the clarity and brightness of the functioning "MACSI". Also, since glass plates of No. 0 thickness are easily broken, great care in handling must be taken to minimize breakage. Obviously, in mass production, assembly can be automated under essentially dust free conditions.

Once a stack 10 of 40 glass plates (plus the incorporated washers) has been assembled, the stack is compressed under slight pressure and held in place while an appropriate means of edge retention is attached to the array, to retain the slight compression. In one embodiment black plastic tape 16 (FIG. 1A) is applied around the periphery to hold the plate stack together and to maintain the slight compression. A glue or plastic applied in liquid form may be used, or any suitable mechanical fastening such as a screw clamp or spring clamp may be used. The compression encourages the plates and washers to align into a flat, essentially parallel array. However, too much compression should be avoided, to the extent that stress interference fringe patterns appear between some of the plates with too much compression. Such interference fringes affect the sharpness and/or the brightness of the functioning "MACSI" device. Appropriate tension is thus that which helps align the plates in parallel relationship but which does not produce any noticeable stress interference fringe effect.

Various arrangements of lenses and lighting alignment incorporating one or more "MACSI" devices have successfully produced the simulated 3-D effect. Specific examples follow.

Figure 2:
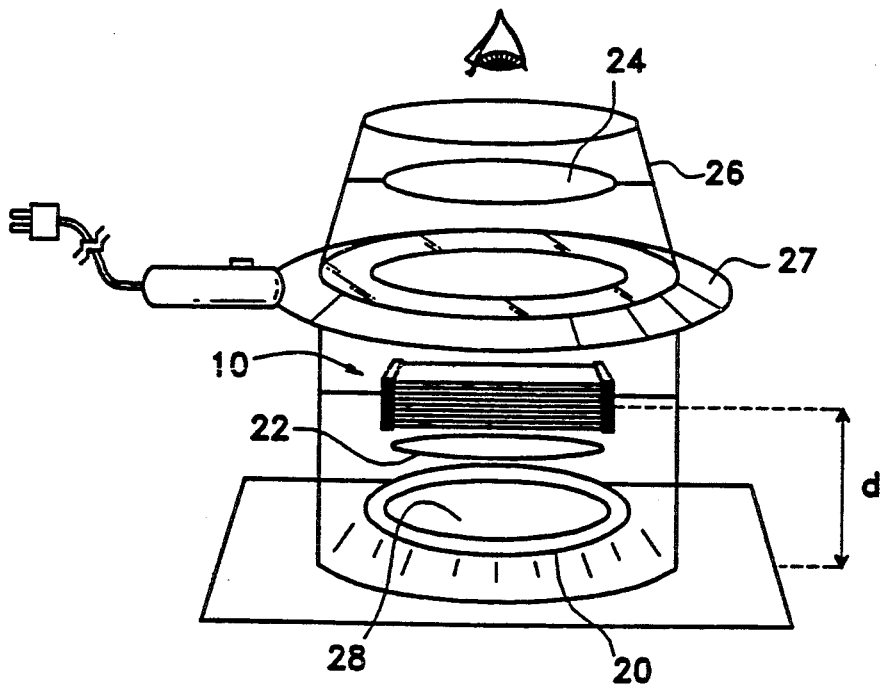
FIG. 2 is a schematic exploded view, partially in perspective, showing an arrangement for viewing a standard two dimensional image, such as a print or other image on flat paper, using the apparatus and method of the invention.

In one such arrangement, shown schematically in FIG. 2, the "MACSI" was mounted over a modified 22 watt circuline fluorescent magnification lamp 20, with a lens 22 (lens: diameter=123 mm focal length=320 mm). The arrangement of the lens, light, etc. is shown schematically. A second lens 24 (diameter=120 mm, focal length=280 mm) was placed approximately 40 mm above the "MACSI" device 10, and held in place by a black plastic canister 26 (inner diameter=125 mm). An optional light shield is shown at 27. FIG. 2 indicates a distance d of the stacked array 10 above an image, and this distance d has optimally been about 2 inches or less.

The entire assembly in this embodiment may be held in position by any appropriate means. A molded containment assembly could be manufactured in a conventional manner. It is noted that proportionately larger sized components will allow a wider viewing area (but will increase cost of construction).

The "MACSI" 3-D effect is then observed by looking directly through the assembled "MACSI" lens array 10 placed parallel or slightly tilted over any source of 2-D images 28 such as photographs, printed images, rear illustrated screens (i.e. for viewing projected transparencies or motion pictures), video/computer screens, paintings, drawings, etc. Images with their own lighting source such as video, computer or rear illuminated screens do not need the fluorescent light source.

Some degree of 3-D effect is experienced with most images viewed in this manner (some images exhibit a greater effect than others). Note that the image can be rotated 360° in the plane parallel to the "MACSI" array 10 with no loss of 3-D effect. However, as the viewer rotates his viewing angle away from an axis normal to the "MACSI" (approaching looking through the taped edge of the "MACSI"), the image clarity and brightness increase, with a concomitant decrease in 3-D effect.

The lenses used in the above described example provided magnification of the depth effect. However, the 3-D simulation can be seen in the absence of any lenses. Curved or fresnel lenses may be used, aligned in any convenient conventional manner to provide useful magnification, projection, or convenient viewing distances. Again, the alignment of one or more (or absence of) lenses in the viewing pathway for optimal desired effects for the particular situation, image and viewer can easily be determined.

Figure 3:
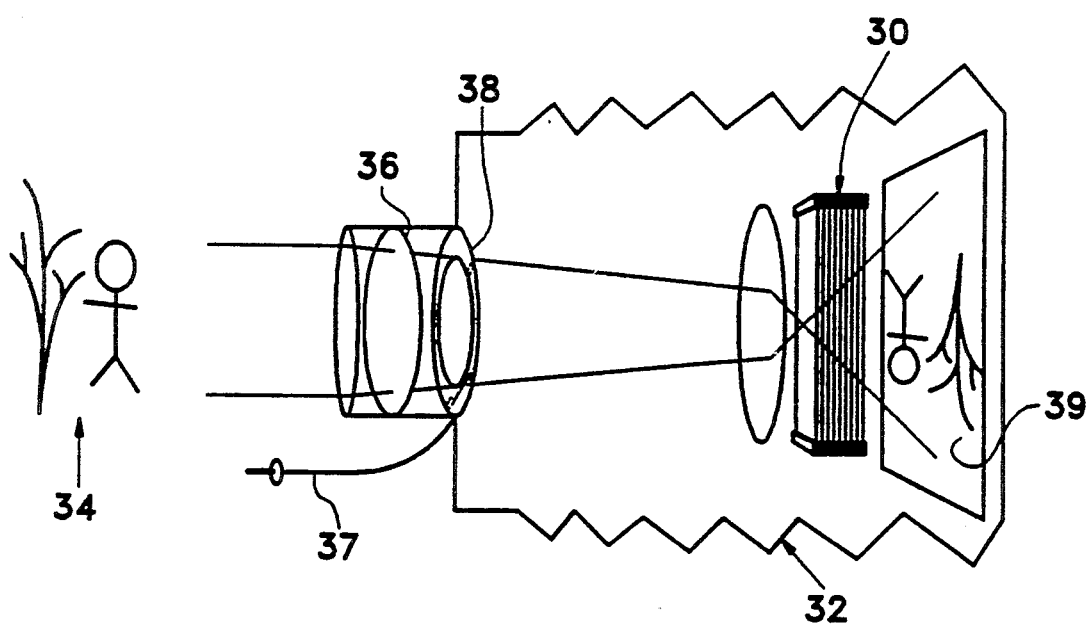
FIG. 3 is a schematic view showing a method and apparatus for producing a dedicated image having characteristics enabling an enhanced three dimensional viewing effect, when later viewed using the apparatus and system of the invention.
Figure 4:
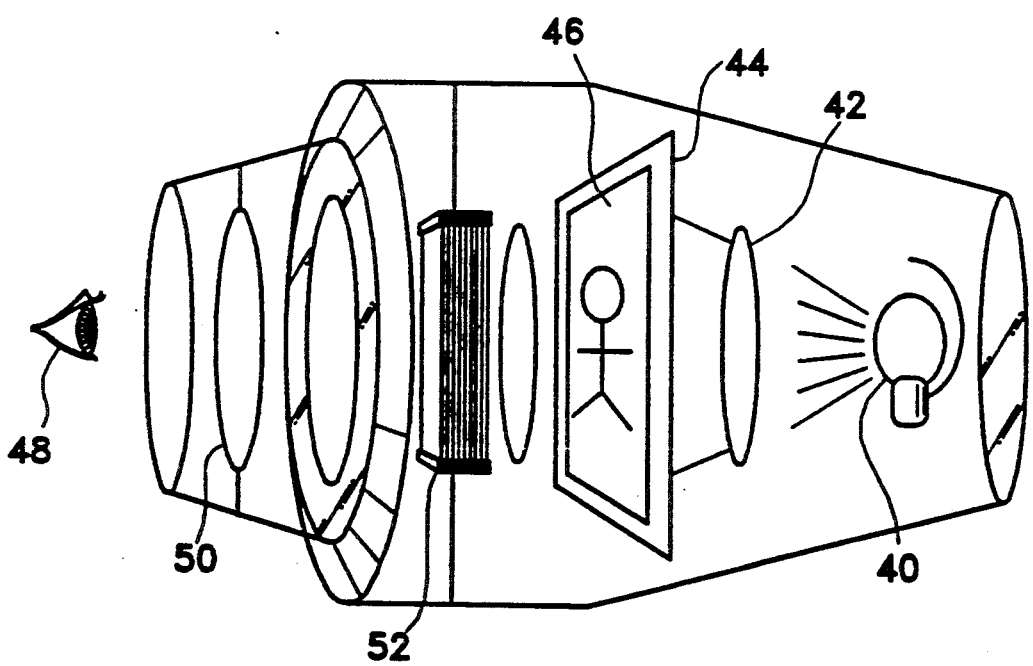
FIG. 4 is a elevation view showing the apparatus and system of the invention used for viewing transparencies in a manner to produce a three dimensional effect.

FIG. 3 illustrates one aspect of the invention which provides a means for recording an image utilizing an incorporated "MACSI" device 30 which, when viewed through the same or a similar "MACSI", provides an enhanced 3-D effect. The "MACSI" is used in connection (for example) with a modified conventional bellows 5"×7" camera 32 to record an image of a three dimensional object or objects 34 for subsequent viewing (FIG. 4). The object 34 may be any of a wide variety of items including, for example, outdoor scenes, scenes including only one or a few discrete objects, images projected by microscopic or telescopic means, or the like. The objects 34 are intended to show a typical indoor or outdoor scene. In one embodiment the object 34 is illuminated with whole, natural or artificial white light, although in some embodiments it may be more useful to utilize lased, polarized, or pulsed light from any recordable wavelength including, but not limited to, ultraviolet or infrared. For these more extreme wavelengths, "MACSIs" with plate elements that provide the appropriate transmission/reflective properties for those specific wavelengths would be incorporated. Also, recording media (i.e. emulsion) sensitive to those wavelengths would be used. Thus, full color, monochromatic, or any degree between these two extremes may be used to generate the recorded images.

As seen schematically in FIG. 3, light reflected from or transmitted through the object(s) 34 is passed through the lens 36 of a camera 32 with conventional optics. For one embodiment, a wide aperture, short focal length lens 36 was employed. A cable shutter release in indicated at 37, for control of a shutter 38 (which is adjustable as to speed as in a conventional view camera). For this particular embodiment a relatively large diameter aperture of 4.5 cm was used in conjunction with relatively large diameter, short focal length double lens assembly (represented schematically by the lens 36); diameter 11.4 cm, focal length 15 cm. A larger aperture provides needed additional light to compensate for light lost due to presence of the "MACSI", but will achieve less depth of focus at the focal plane.

However, selective focus in many cases, can actually enhance the apparent three dimensional effect; and it has been found that the passage of the light through the "MACSI" en route to the focal plane seems to give the appearance of an enhanced depth of field. The image light from the lens 36 passes through the "MACSI" apparatus 30 (as described in more detail in FIG. 1) before focusing on a recording medium 39 which in this case was 5"×7" Kodak Ektachrome 64 color transparency film, later processed as per Kodak instructions. All of these components were assembled in a modified Korona 5"×7" portrait camera 32. Incorporating larger or smaller "MACSI" devices in larger or smaller modified cameras, e.g. 35 mm, have similarly produced satisfying 3-D effects. Similarly modified video cameras or other electronic image recording systems may be used. In addition, various positional arrangements of the "MACSI" relative to the lens or film plate have produced successful 3-D images. Finally, even conventional 50 mm lens/aperture arrangements have produced satisfactory 3-D images.

The image recording medium 39 can include emulsion film (negative/print, transparency, or motion picture film) or an electronic image recording medium (e.g. video charge-coupled device).

FIG. 4 illustrates one embodiment of the invention for viewing back-lighted transparencies. An illumination source 40 directs light through a condensing lens 42, to direct the condensed light against the back of a diffuser 44, which may be of frosted glass, for example. An exposed, developed transparency 46 is positioned in front of the diffuser so as to receive light at a substantially even level across the transparency. The viewer, indicated by the eye 48, views the transparency image through a focussing lens 50 and a "MACSI" array 52, which may be similar to the "MACSI" device 30 or 10 described previously. It is noted that the focussing lens 50 is representative only, and the transparency may be viewed through the "MACSI" device 52 without any focussing lens, with one focussing lens or with a series of lenses for conveniently and optimally focussing the image at a position to be conveniently viewed by the viewer.

As discussed above, it has been found that the assembled array of stacked glass plates in accordance with the invention, which acts as a series of closely spaced interferometers, will produce a significant three dimensional effect in the viewing of any two dimensional image, provided adequate lighting is present. In addition, if the arrangement shown in FIG. 3, or another arrangement with a modified type of camera as outlined above, is used in making an image of an object or scene using the "MACSI" device, an enhanced dedicated two dimensional image will result. Such a dedicated 3-D effect image (in two dimensions) will appear less sharp to the naked eye (as if taken through a "fog" filter). However, when the "MACSI" device is used to view the dedicated image, such as with the arrangement of FIG. 2, a somewhat enhanced three dimensional effect usually will be observed, stronger than the effect when normal two dimensional images are viewed using the "MACSI" device.

Figure 5:
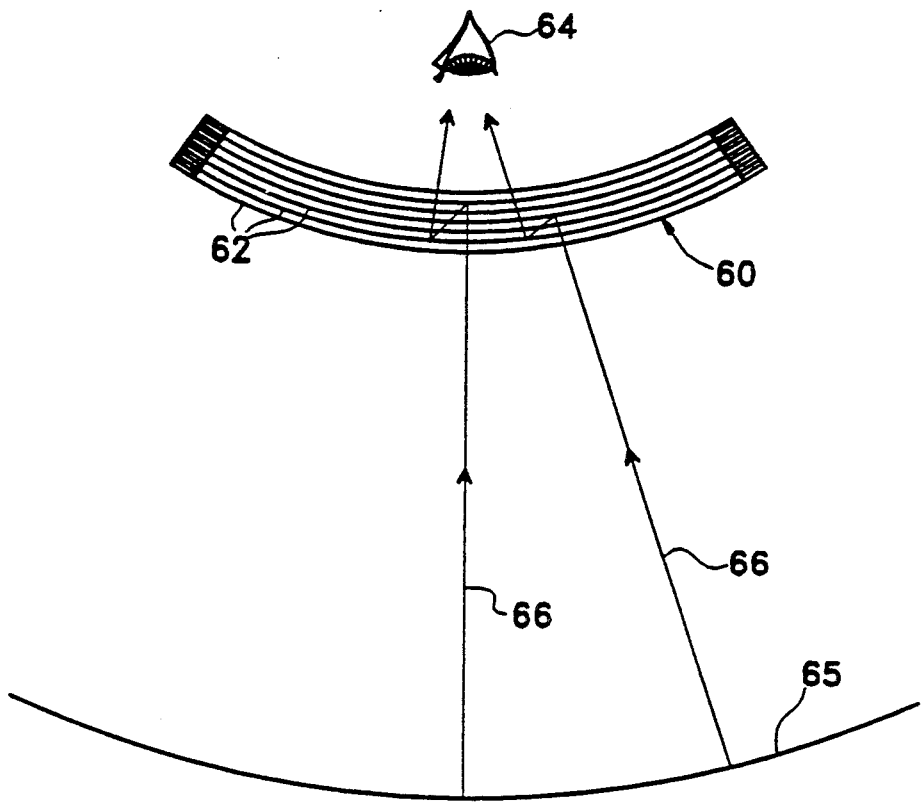
FIG. 5 is a schematic view indicating the structure of another embodiment of the device and method of the invention, wherein the stack of transparent plates is curved.

FIG. 5 indicates schematically another embodiment of a "MACSI" device 60, wherein the transparent plates 62 are curved. The curve may be in the form of a portion of a cylinder, a portion of a sphere or portion of a cone (i.e. parabolic). The transparent plates 62 are curved to smaller and smaller diameters in the direction of the viewer 64, such that each adjacent pair is still mutually parallel, in the sense of being equidistant at all points. The curved "MACSI" device 60 may advantageously be used for viewing a curved screen or print 65, having the same general type of curvature. FIG. 5 indicates light rays 66 schematically, indicating that the light rays internally reflect several times between plates of the device 60 before reaching the eye of the viewer 64, to produce the three dimensional effect.

Figure 6:
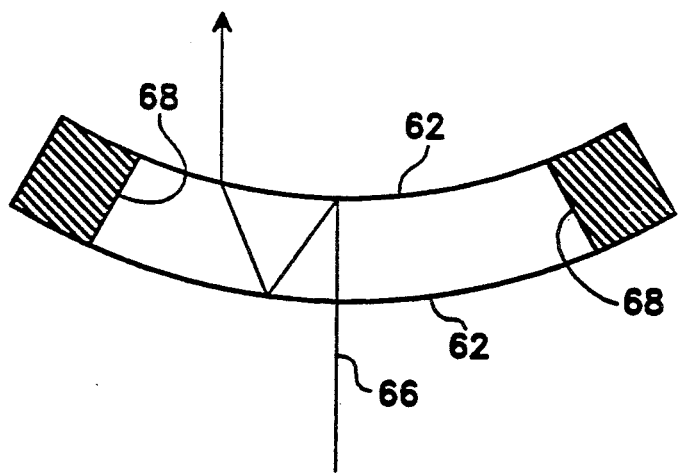
FIG. 6 is a detail view showing a pair of adjacent plates or a single interferometer component, corresponding to the curved embodiment shown in FIG. 5, and with the spacing shown exaggerated.

FIG. 6 also schematically indicates a single light ray 66, internally reflecting between the opposed surfaces of two adjacent curved transparent plates 62. Spacers or separators are indicated at 68.

Figure 7:
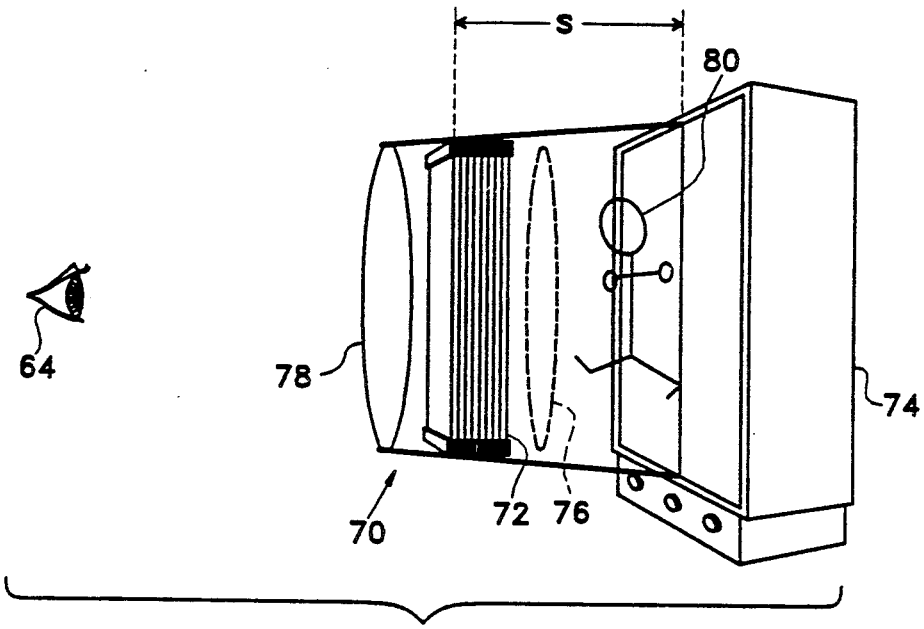
FIG. 7 is a schematic view in perspective showing an embodiment of the invention particularly useful for viewing video screens, computer screens or rear projection screens.

FIG. 7 shows one embodiment of a "MACSI" device assembly 70, including a device 72 similar to previously described flat plate embodiments of the device. The arrangement 70 shown in FIG. 7 is particularly for viewing a video screen or computer screen, as illustrated with the television or monitor 74, or a rear projection screen. The assembly 70 attaches to or near the video screen. The distances between the "MACSI" device 72 and the screen surface is usually less than about 2 inches—successful viewing effects are seen when the "MACSI" device contacts the surface, in the absence of a lens 76 which is shown in the embodiment of FIG. 7. A second, outer lens 78 may be included, to enlarge and focus the image seen by the viewer's eye 64. With this arrangement, the viewer tends to see an image 80 from the screen with a three dimensional effect.

Figure 8:
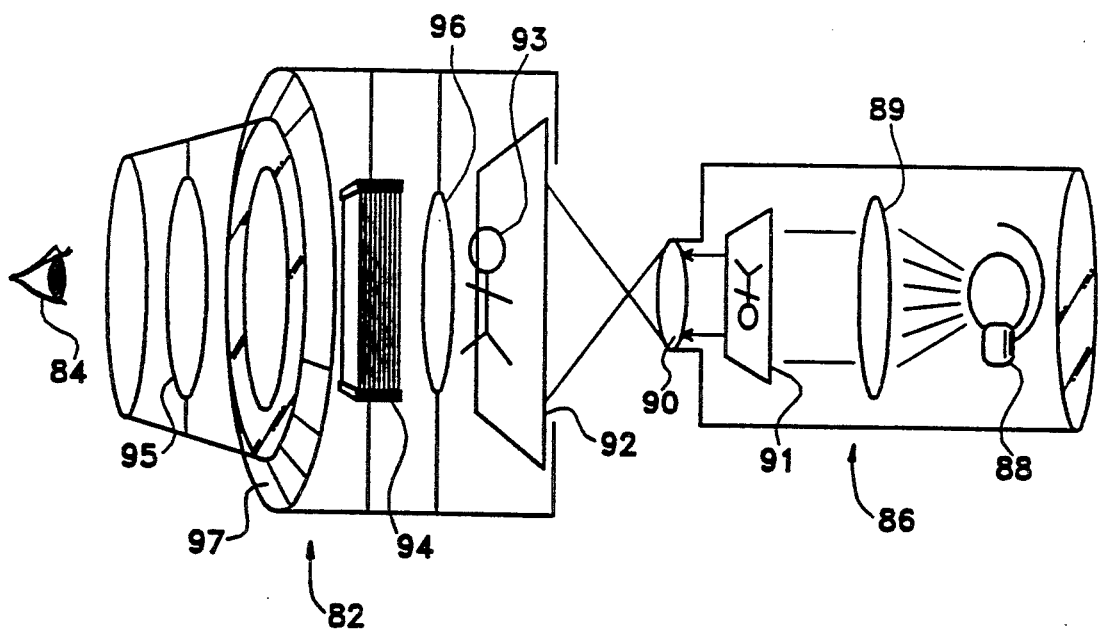
FIG. 8 is a schematic view, partially in perspective, showing an embodiment of the invention useful for viewing projected images such as from slides, motion pictures or transparencies. The arrangement of FIG. 8 is generally an alternative to that shown in FIG. 4.

FIG. 8 shows another embodiment of the invention, wherein slides, motion pictures or transparencies are viewed through a viewer device 82 located near the user's eye or eyes 84. FIG. 8 shows a projecting system 86 of typical construction, such as a slide projector, motion picture projector, transparency projector or opaque projector. It includes an illumination source 88, a lens 89 and a front element or objective lens 90, with a transparency or slide 91 (shown as an example—it can be a motion picture film) just behind the front element 90.

The viewer device 82, which may be hand-held or mounted just in front of the viewer 84, has a rear view screen 92, such as of translucent glass or plastic. The image 93 from the slide or other source is projected onto the screen 92 and appears to the viewer 84 with a three dimensional effect. This is achieved by viewing the projected image through a "MACSI" device 94, with or without optional adjustable lenses 95 and 96, and with or without an optional light shield 97.

Figure 9:
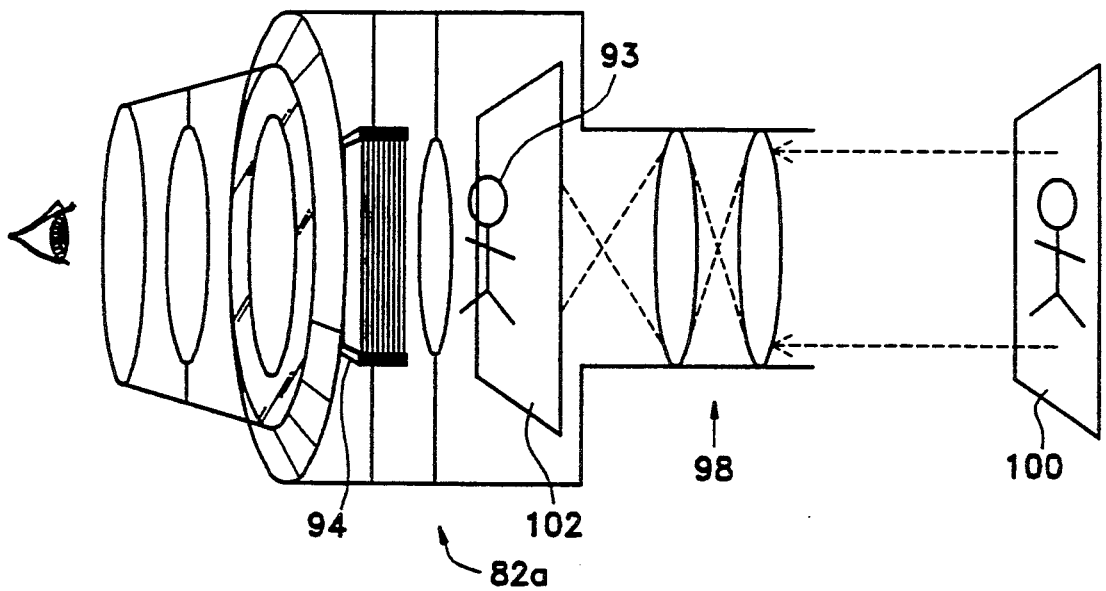
FIG. 9 is another schematic view, partially in perspective, showing an embodiment of the invention useful for viewing a distant screen, such as a video screen or movie theater screen, or illuminated image (i.e. print, photograph, painting, etc.).

FIG. 9 is a similar schematic view showing a viewer device 82a which is similar to the viewing device 82 of FIG. 8. The device 82a is shown including a double adjustable lens system 98 for focussing (and reinverting the image to the upright position), to accommodate different distances to a viewing screen 100, which may be a television screen, motion picture screen, computer screen, illuminated images (such as photos or prints), etc. Light from the image on the screen 100 travels through the adjustable lens system 98 and is projected onto a translucent screen 102 and the "MACSI" device 94 enables the viewer to see the image 93 with one or both eyes, providing a three dimensional effect.

It should be understood that the invention can be used with any projected image, including a live image generated, for example, by a telescopic or microscopic apparatus which projects a live image onto a screen. Thus, the two-dimensional image viewed with the "MACSI" device need not be a recorded image but can be a live image.

The above described preferred embodiments are intended to illustrate the principles of the invention, but not to limit its scope. Other embodiments and variations to this preferred embodiment will be apparent to those skilled in the art and may be made without departing from the spirit and scope of the invention as defined in the following claims.

I claim:

1. An apparatus for use in viewing a two dimensional image, for producing a three dimensional effect to a viewer, comprising:

a stack of substantially parallel and substantially transparent plates positioned between the two dimensional image and the viewer, the stack of plates including spacer means between adjacent plates for holding the plates in substantially parallel and closely spaced relationship without obstructing view through the stack of plates, illumination means for illuminating the two dimensional image, said plates being nearly one hundred percent transmissive to light from the image, but partially reflective, and the number of said plates being sufficient to produce a three dimensional effect whereby some elements of the image appear closer to the viewer than other elements of the image, but the number being not so great as to cause excessive reflection such that the viewer has difficulty seeing the image comfortably.

2. The apparatus of claim 1, wherein the number of plates is between about 10 and 100.

3. The apparatus of claim 1, wherein the number of plates is between about 25 and 60.

4. The apparatus of claim 1, wherein the number of plates is between about 30 and 55.

5. The apparatus of claim 1, wherein the number of plates is about 40, with each plate having a thickness of about 0.1 to 0.25 mm.

6. The apparatus of claim 5, wherein the spacing between adjacent plates is in the range of about 0.1 to 0.25 mm.

7. The apparatus of claim 1, wherein the stack of plates, with spacer means between adjacent plates, is slightly compressed and held in the compressed configuration, whereby the plates are held substantially parallel and in fixed relation, with edge fastening means for retaining the plates in the slightly compressed configuration.

8. The apparatus of claim 1, further including a magnifying lens between the viewer and the image.

9. The apparatus of claim 8, wherein the magnifying lens is positioned between the viewer and the stack of plates.

10. The apparatus of claim 1, wherein the stack of substantially parallel plates is divided into at least two separate stacks, separated by a spacing between the stacks.

11. The apparatus of claim 1, wherein the stack of plates with spacer means is curved, with adjacent plates substantially equidistant at all points on the plates.

12. The apparatus of claim 1, wherein the plates in the stack of plates are planar.

13. The apparatus of claim 1, wherein the plates are coated with reflection enhancing coatings to establish a controlled slight reflectivity while maintaining the plates substantially transparent.

14. The apparatus of claim 1, wherein the plates are coated with reflection inhibiting coatings.

15. A method for viewing a two dimensional image in a way as to produce a three dimensional effect to the viewer, comprising, providing a stack of substantially parallel and substantially transparent plates, with spacer means between adjacent plates for holding the plates in substantially parallel and closely spaced relationship without obstructing view through the plates, the plates being nearly 100% transmissive to light, but partially reflective, and the number of the plates being sufficient to produce a three dimensional effect by which some elements of the image appear closer to the viewer than other elements of the image, but the number of plates being not so great as to cause excessive reflection such that the viewer has difficulty seeing the image comfortably, positioning the stack of plates between the two dimensional image and the viewer's eyes, illuminating the two dimensional image sufficiently to permit the image to be viewed through the stack of plates, and viewing the image through the stack of plates.

* * * * *